United States Patent
Takano et al.

(10) Patent No.: US 11,905,765 B2
(45) Date of Patent: Feb. 20, 2024

(54) THREADED JOINT FOR PIPES

(71) Applicant: JFE STEEL CORPORATION, Tokyo (JP)

(72) Inventors: Jun Takano, Tokyo (JP); Takamasa Kawai, Tokyo (JP); Takuya Nagahama, Tokyo (JP); Seigo Goto, Tokyo (JP); Masaki Yoshikawa, Tokyo (JP); Tsuyoshi Yoneyama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/757,722

(22) PCT Filed: Sep. 11, 2020

(86) PCT No.: PCT/JP2020/034513
§ 371 (c)(1),
(2) Date: Jun. 20, 2022

(87) PCT Pub. No.: WO2021/131177
PCT Pub. Date: Jul. 1, 2021

(65) Prior Publication Data
US 2023/0044251 A1    Feb. 9, 2023

(30) Foreign Application Priority Data
Dec. 26, 2019  (JP) ................. 2019-236848

(51) Int. Cl.
*F16L 15/06* (2006.01)
*E21B 17/042* (2006.01)
*F16L 15/00* (2006.01)

(52) U.S. Cl.
CPC .......... *E21B 17/042* (2013.01); *F16L 15/001* (2013.01); *F16L 15/06* (2013.01)

(58) Field of Classification Search
CPC ........ F16L 15/06; F16L 15/001; E21B 17/042
See application file for complete search history.

(56) References Cited

U.S. PATENT DOCUMENTS

| | | | |
|---|---|---|---|
| 4,113,290 A * | 9/1978 | Miida ................. | F16L 15/003 285/334 |
| 6,030,004 A | 2/2000 | Schock et al. | |

(Continued)

FOREIGN PATENT DOCUMENTS

| | | |
|---|---|---|
| CN | 103362459 A | 10/2013 |
| CN | 204782815 U | 11/2015 |

(Continued)

OTHER PUBLICATIONS

May 10, 2022, Notification of Reasons for Refusal issued by the Japan Patent Office in the corresponding Japanese Patent Application No. 2021-513477 with English language Concise Statement of Relevance.

(Continued)

*Primary Examiner* — David Bochna
(74) *Attorney, Agent, or Firm* — KENJA IP LAW PC

(57) ABSTRACT

To prevent fracture of a box under a tensile load without increasing the outer diameter of the box. The presently disclosed threaded joint for pipes includes a pin provided with a male thread portion at one end of a first pipe, and a box provided with a female thread portion at one end of a second pipe, where each of a plurality of thread grooves of the female thread portion has a corner portion on a load flank side and a corner portion on a stabbing flank side on a thread bottom side, a corner portion on a load flank side of a first thread groove includes a first arc portion that has a first curvature radius, and a second arc portion that has a second curvature radius, and a ratio of the second curvature radius to the first curvature radius is 3 or more.

12 Claims, 10 Drawing Sheets

(56) References Cited

U.S. PATENT DOCUMENTS

| | | | |
|---|---|---|---|
| 8,668,232 B2 | 3/2014 | Mazzaferro et al. | |
| 9,709,196 B2 | 7/2017 | Kawai et al. | |
| 9,874,058 B2 | 1/2018 | Benedict | |
| 10,295,091 B2 | 5/2019 | Yoshikawa et al. | |
| 2002/0113436 A1* | 8/2002 | Verdillon | F16L 15/004 |
| | | | 285/333 |
| 2003/0038476 A1* | 2/2003 | Galle, Jr. | E21B 17/042 |
| | | | 285/390 |
| 2003/0132633 A1* | 7/2003 | Maeda | F16L 15/06 |
| | | | 285/333 |
| 2016/0032663 A1* | 2/2016 | Benedict | E21B 17/042 |
| | | | 72/370.18 |
| 2017/0122468 A1* | 5/2017 | Sugino | E21B 17/042 |
| 2017/0321826 A1 | 11/2017 | Watts | |

FOREIGN PATENT DOCUMENTS

| | | | |
|---|---|---|---|
| CN | 106574489 A | 4/2017 |
| CN | 215596629 U | 1/2022 |
| EP | 3842679 A1 | 6/2021 |
| JP | H06281059 A | 10/1994 |
| JP | 2017072187 A | 4/2017 |
| JP | 2017125613 A | 7/2017 |
| WO | 2015111117 A1 | 7/2015 |

OTHER PUBLICATIONS

May 18, 2022, Office Action issued by the China National Intellectual Property Administration in the corresponding Chinese Patent Application No. 202011451231.6 with English language Search Report.

Nov. 10, 2020, International Search Report issued in the International Patent Application No. PCT/JP2020/034513.

Dec. 21, 2022, the Extended European Search Report issued by the European Patent Office in the corresponding European Patent Application No. 20905534.2.

* cited by examiner

THREADED JOINT FOR PIPES

TECHNICAL FIELD

This disclosure relates to a threaded joint for pipes.

BACKGROUND

Threaded joints for pipes are widely used to connect steel pipes which are used in oil industrial facilities such as oil country tubular goods (OCTG).

FIG. 1 schematically illustrates an example of the structure of a typical threaded joint for pipes. The threaded joint for pipes 100 includes a pin 110 provided with a male thread portion 111, which is a male tapered thread, at one end of a first pipe, and a box 120 provided with a female thread portion 121, which is a female tapered thread to be screwed with the male thread portion, at one end of a second pipe.

An unthreaded portion 112, which is a portion without thread, is provided at the tip of the pin 110, that is, on the tip side farther than the male thread portion 111. The unthreaded portion 112 includes a seal portion 113 and a shoulder portion 114 almost perpendicular to the pipe axis. On the other hand, the box 120 is provided with an unthreaded portion 122 on a position nearer the center side in the pipe axis direction than the female thread portion 121, that is, on the side opposite to the end. The unthreaded 122 also includes a seal portion 123 and a shoulder portion 124 almost perpendicular to the pipe axis. When the pin 110 and the box 120 are tightened, the unthreaded portion 112 of the pin 110 and the unthreaded portion 122 of the box 120 contact with each other to form a metal-metal contacting seal, as illustrated in FIG. 1.

FIG. 2 schematically illustrates the shape of a thread groove 200 of the female thread portion 121 formed in the box 120 in the typical threaded joint for pipes. In FIG. 2, the upper side is the thread bottom side, and the thread groove 200 has a substantially trapezoidal shape with a straight thread bottom portion 210 parallel to the taper of the female thread. The thread groove 200 includes a linear load flank 220 on the left side of FIG. 2, that is, on the rear side in the insertion direction of the pin 100. The thread groove 200 also includes a linear stabbing flank 230 on the right side of FIG. 2, that is, on the front side in the insertion direction of the pin 100. Further, the thread groove 200 includes a corner portion 240 on the load flank side and a corner portion 250 on the stabbing flank side on the thread bottom side, and the corner portion 240 on the load flank side and the corner portion 250 on the stabbing flank side are each composed of one arc.

Such a threaded joint for pipes is required to have various properties such as tensile resistance, compression resistance, bending resistance, and sealing properties. The excavation and production environments are becoming more and more severe, especially in recent years, because wells for drilling crude oil and natural gas are deepened, and the number of horizontal wells and inclined wells is increasing in addition to conventional vertical wells. Therefore, the threaded joint for pipes is required not to fracture even in such harsh environments.

The fracture of a threaded joint starts from a crack in a thread groove of the box. Especially when a tensile load is applied to the threaded joint, stress is concentrated in the corner portion on the load flank side of a first thread groove, which is a thread groove farthest from the end of the box, so that it is necessary to suppress the occurrence of crack in the first thread groove to prevent the fracture of the threaded joint.

WO/2015/111117 (PTL 1) proposes that the tensile efficiency (TE), the height t of the female thread of the box, and the curvature radius p of the arc forming the corner portion on the load flank side of the first thread groove be controlled to satisfy the relationship specified by a specific mathematical formula, to prevent the fracture of a threaded joint for pipes.

CITATION LIST

Patent Literature

PTL 1: WO/2015/111117

SUMMARY

Technical Problem

However, the conventional technology as proposed in PTL 1 has the following problems.

The tensile efficiency TE, which is one of the parameters used in PTL 1, is a value defined as a ratio of the cross section at a first thread position of the box with respect to the cross section at a raw pipe portion of the pin. As the tensile efficiency increases, it means that the limit tensile properties of the joint increase. Therefore, increasing the outer diameter of the box and increasing the tensile efficiency can improve the limit tensile properties of the joint. As used herein, the raw pipe portion refers to a portion without thread in a pipe.

However, from the viewpoint of reducing costs of oil well excavation, it is required to reduce mining during well excavation, so that it is necessary to reduce the outer diameter of the box. Therefore, the fracture should be prevented without increasing the tensile efficiency to meet the requirements of both fracture prevention and cost reduction.

On the other, PTL 1 controls the tensile efficiency TE, the height t of the female thread of the box, and the curvature radius p of the arc forming the corner portion on the load flank side of the first thread groove to satisfy the relationship in the following formula.

$$TE(\%) \geq 2.25 \times t/\rho + 99.9$$

As can be seen from the above formula, increasing the curvature radius ρ can reduce the tensile efficiency TE. In practice, however, it is necessary to increase the height t of the female thread of the box to increase the curvature radius ρ, so that increasing of the outer diameter of the box cannot be avoided. When the height t of the female thread is increased, the time required for cutting the thread increases, which decreases the productivity of the threaded joint.

Further, when the curvature radius ρ is increased, the arc of the corner portion on the load flank side and the arc of the corner portion on the stabbing flank side interfere with each other, so that the ρ cannot be increased too much. It is particularly difficult to increase the ρ in a pipe with a small diameter because such a pipe usually has a thread shape with small thread width. As a result, increasing of the tensile efficiency cannot be avoided to prevent the fracture.

As described above, the conventional technology cannot solve the two conflicting problems of fracture prevention and cost reduction.

It could thus be helpful to provide a technique of preventing the fracture of a box under tensile load without increasing the outer diameter of the box.

Solution to Problem

To solve the problem, we conducted finite element analysis (FEA) to examine the effect of the axial cross-sectional shape of a thread groove provided in a box. As a result, we found that, by further providing another arc at a corner portion on the load flank side of the thread bottom that has conventionally been composed of a single arc and setting the curvature radius of the added arc larger than that of the single arc, stress concentration on the corner portion can be alleviated, and stress can be distributed over the entire thread bottom. The following describes an example of the analysis results, referring to FIGS. 3 and 4.

FIG. 3 is a contour diagram illustrating the distribution of plastic strain in the vicinity of the first thread groove in a conventional thread groove shape, as determined by FEA. The member located on the upper side of the figure is a box, the member located on the lower side is a pin, and the thread groove on the right side of the two thread grooves illustrated in the figure is the first thread groove. Each thread groove provided in the box is a trapezoidal thread with a straight thread bottom portion parallel to the taper of the female thread. The side surfaces of the thread groove include a stabbing flank surface (right side in the figure) and a load flank surface (left side in the figure), and when a tensile load is applied in the pipe axial direction, the load is applied on the load flank surface. The thread groove has a corner portion on the load flank side and a corner portion on the stabbing flank side on the thread bottom side, and the corner portion on the load flank side and the corner portion on the stabbing flank side are each composed of one arc.

As can be seen from FIG. 3, plastic strain is concentrated at the corner portions of the first thread groove in a conventional thread groove shape, with the greatest plastic strain at the corner portion on the load flank side.

On the other hand, FIG. 4 is a contour diagram illustrating the distribution of plastic strain when another arc is further provided at the corner portion on the load flank side of the thread groove illustrated in FIG. 3. The curvature radius of the added second arc is set to 11.5 times the curvature radius of the first arc. The thread groove shape illustrated in FIG. 4 corresponds to the thread groove shape in the first embodiment of the present disclosure, which will be described later.

From the results illustrated in FIG. 4, it is understood that, unlike the case of FIG. 3, the concentration of plastic strain in the corner portions of the thread bottom is alleviated, and the plastic strain is distributed over the entire bottom of the thread groove.

As described above, by further providing another arc at a corner portion on the load flank side of the thread bottom that has conventionally been composed of a single arc and setting the curvature radius of the added arc larger than that of the single arc, stress concentration on the corner portion can be alleviated, and stress can be distributed over the entire thread bottom. As a result, occurrence of crack due to plastic deformation and fracture of a box caused by the crack can be prevented. Note that FIGS. 3 and 4 illustrate the distribution of plastic strain rather than the distribution of stress. This is because, in a portion where stress above a certain level is applied, the stress is relieved by plastic deformation, resulting in an apparently reduced stress. To assess the risk of occurrence of crack in practice, it is more appropriate to use plastic strain than using stress itself.

In the FEA, a threaded joint with the above-described structure is first subjected to analysis simulating screw tightening, and then the FEA was further carried out under conditions of applying a combined load of tension/compression and internal pressure/external pressure in accordance with ISO 13679: 2002 Test Series A.

The present disclosure is based on the above finding and has the following primary features.

1. A threaded joint for pipes, comprising
    a pin provided with a male thread portion, which is a male tapered thread, at one end of a first pipe, and
    a box provided with a female thread portion, which is a female tapered thread to be screwed with the male thread portion, at one end of a second pipe, wherein
    the female thread portion has a plurality of thread grooves,
    each of the plurality of thread grooves has a corner portion on a load flank side and a corner portion on a stabbing flank side on a thread bottom side,
    a corner portion on a load flank side of a first thread groove, which is the thread groove farthest from an end of the box among the plurality of thread grooves, comprises a first arc portion that is directly connected to a load flank and has a first curvature radius, and a second arc portion that is directly or indirectly connected to the first arc portion and has a second curvature radius, and
    a ratio of curvature radius, which is a ratio of the second curvature radius to the first curvature radius, is 3 or more.

2. The threaded joint for pipes according to 1., wherein the second arc portion is directly connected to the first arc portion.

3. The threaded joint for pipes according to 1., wherein the second arc portion is connected to the first arc portion via a straight portion.

4. The threaded joint for pipes according to any one of 1. to 3., wherein the corner portion on the load flank side of the first thread groove further comprises a third arc portion directly or indirectly connected to the second arc portion.

5. The threaded joint for pipes according to any one of 1. to 4., wherein the first thread groove has a straight thread bottom portion parallel to a taper of the female thread portion.

Advantageous Effect

According to the present disclosure, it is possible to prevent fracture of a box under a tensile load without increasing the outer diameter of the box. The threaded joint for pipes of the present disclosure can be suitably used to connect oil well pipes used for oil and gas exploration and production, line pipes used for transporting oil and gas, and the like.

DETAILED DESCRIPTION

Figure 1:
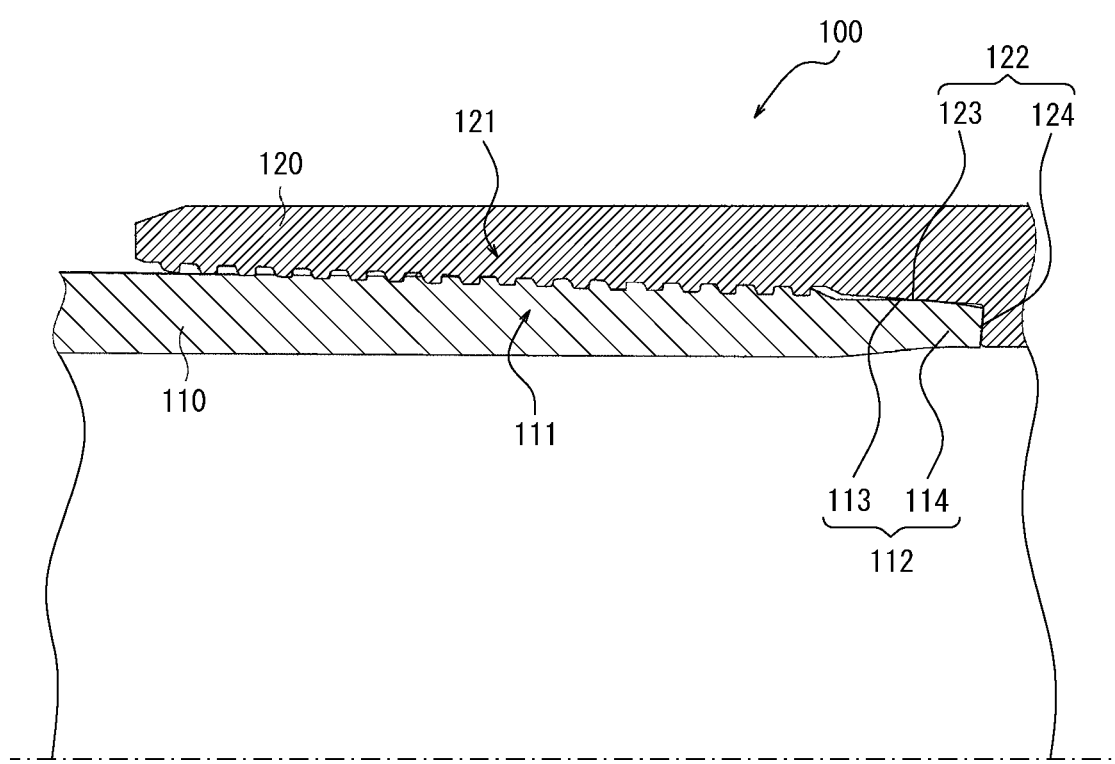
FIG. 1 schematically illustrates an example of the structure of a typical threaded joint for pipes.
Figure 2:
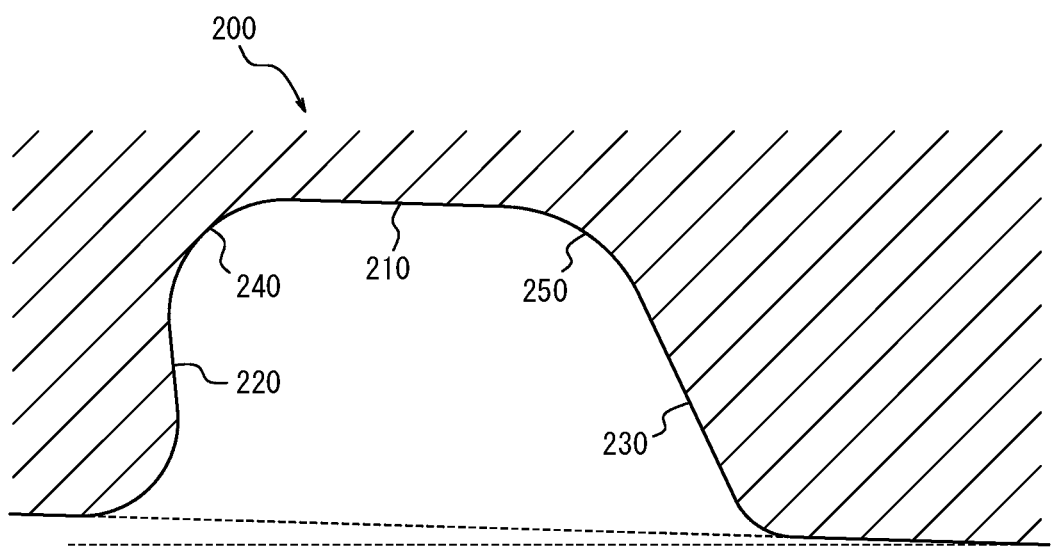
FIG. 2 schematically illustrates the shape of a thread groove of a female thread portion formed in a box in a typical threaded joint for pipes.
Figure 3:
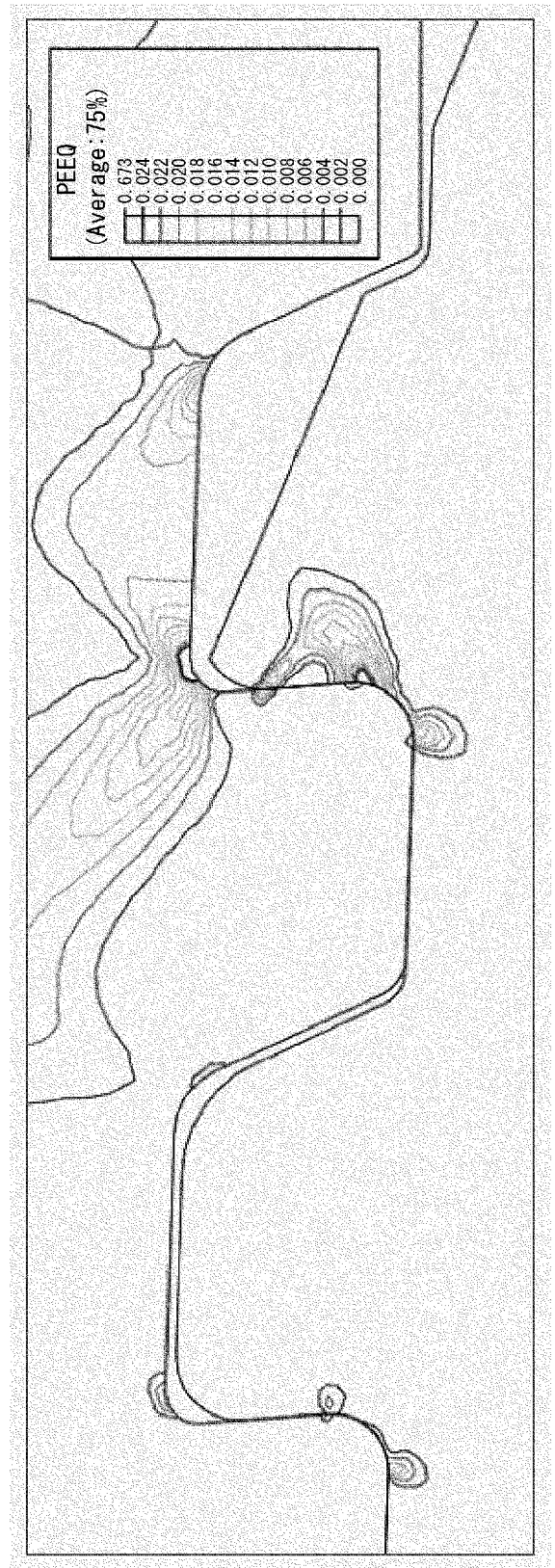
FIG. 3 is a contour diagram illustrating the distribution of plastic strain in the vicinity of a first thread groove in a conventional thread groove shape, as determined by FEA.
Figure 4:
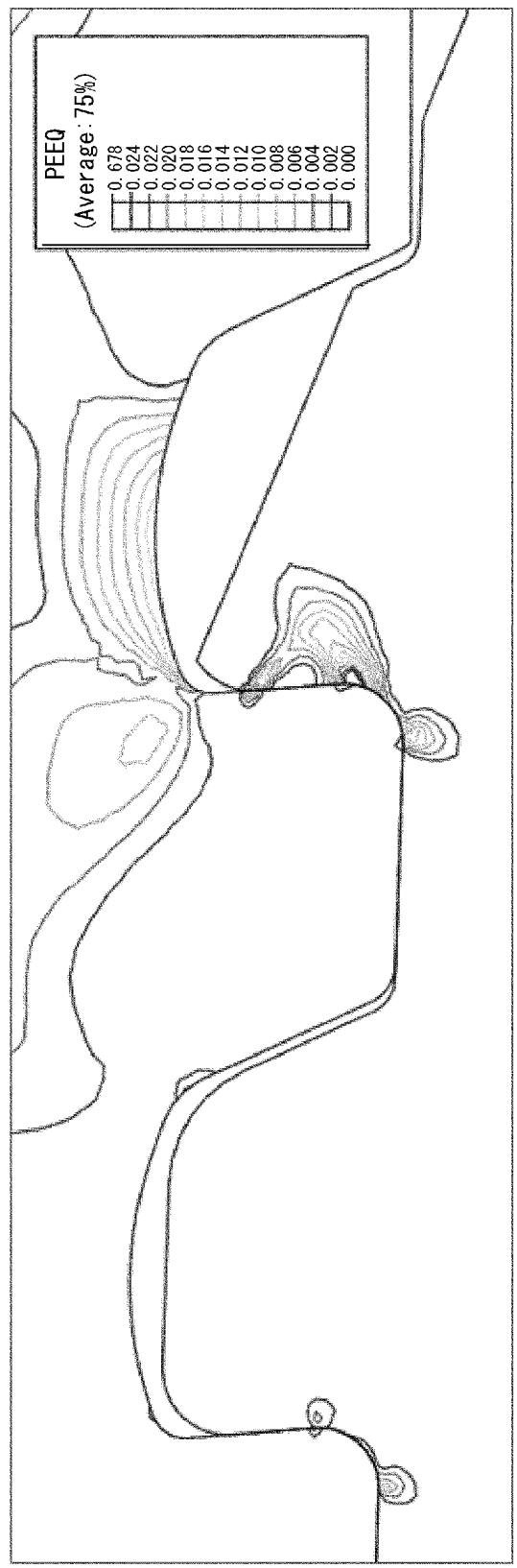
FIG. 4 is a contour diagram illustrating the distribution of plastic strain in the vicinity of a first thread groove in the thread groove shape in one embodiment of the present disclosure, as determined by FEA.

The following provides details of a method of carrying out the present disclosure. The following description merely presents examples of preferred embodiments of the present disclosure, and the present disclosure is not limited to these embodiments. In the following description, the terms "load flank" and "stabbing flank" are used in the usual sense of the technical field. In other words, the "load flank" refers to a straight flank on the side on which a load is applied by the tensile force in the pipe axial direction, and the "stabbing flank" refers to a straight flank on the opposite side of the load flank. In the present specification, the shape of a thread groove refers to the shape of a thread groove when it is formed, that is, before the pin and the box are tightened.

A threaded joint for pipes in one embodiment of the present disclosure (hereinafter, may be simply referred to as "threaded joint") includes a pin provided with a male thread portion, which is a male tapered thread, at one end of a first pipe, and a box provided with a female thread portion, which is a female tapered thread to be screwed with the male thread portion, at one end of a second pipe. The female thread portion of the box has a plurality of thread grooves, and the thread groove farthest from the end of the box among the plurality of thread grooves is defined as a "first thread groove". However, in those thread grooves, only a thread groove that substantially engages with a thread on the pin side is considered as a thread groove when determining the first thread groove.

Each of the plurality of thread grooves has a corner portion on a load flank side and a corner portion on a stabbing flank side on the thread bottom side. The corner portion on the load flank side of the first thread groove includes at least two arc portions.

[Ratio of Curvature Radius]

Of the two arc portions provided in the corner portion on the load flank side of the first thread groove, one is a first arc portion that is directly connected to the load flank and has a first curvature radius, and the other is a second arc portion that is directly or indirectly connected to the first arc portion and has a second curvature radius. In the present disclosure, it is important that a ratio of curvature radius, which is a ratio of the second curvature radius to the first curvature radius, be 3 or more.

By providing a second arc portion that satisfies the above conditions, stress concentration in the corner portion on the load flank side can be alleviated, and stress can be distributed over the entire thread bottom. As a result, fracture of the box can be prevented. In contrast, a conventional thread joint has only one arc in the corner portion on the load flank side, so that it is necessary to increase the outer diameter of the box to prevent fracture, as described above.

As described above, stress mainly concentrates at the corner portions of the first thread groove. Therefore, when the first thread groove has the above structure, the above effect can be obtained regardless of the shape of the other thread grooves. For that reason, the structure of thread grooves other than the first thread groove is not particularly limited in the present disclosure. However, it is preferable that all thread grooves in the box meet the above requirements from the viewpoint of ease of production. In other words, it is preferable that the corner portion on the load flank side of all thread grooves of the box include a first arc portion that is directly connected to the load flank and has a first curvature radius and a second arc portion that is directly or indirectly connected to the first arc portion and has a second curvature radius, and that a ratio of curvature radius, which is a ratio of the second curvature radius to the first curvature radius, be 3 or more.

The upper limit of the ratio of curvature radius is not limited. However, when the ratio of curvature radius exceeds 15, the effect of alleviating stress saturates. Therefore, the ratio of curvature radius may be 15 or less. Further, it is preferable that the first arc portion and the second arc portion be smoothly connected so that the connecting portion has a common tangent line. It is more preferable that each arc portion and straight portion of the corner portion on the load flank side be smoothly connected to an adjacent arc portion or straight portion so that the connecting portion has a common tangent line.

(Curvature Radius)

The curvature radius of each of the first and second arc portions is not particularly limited and may be any value. The curvature radius of the first arc portion may be, for example, 0.008 to 0.025 inches. On the other hand, the curvature radius of the second arc portion may be, for example, 0.030 to 0.200 inches.

(Angle θ)

The angle θ of the first arc portion is not particularly limited. However, when the angle θ of the first arc portion is 50° or more, the second arc portion does not need to be excessively large, so that the need to increase the size of the thread groove can be further reduced. Therefore, the angle θ of the first arc portion is preferably 50° or more. On the other hand, when the angle θ of the first arc portion is 75° or less, it is possible to prevent the first arc portion from extending to a position where stress is likely to concentrate, so that the effect of dispersing stress can be further enhanced. Therefore, the angle θ of the first arc portion is preferably 75° or less. As used herein, the "angle θ of the first arc portion" is defined as an angle between a straight line "a" parallel to the pipe axis and the radius "r" at the end of the first arc portion on the opposite side of the load flank (see FIGS. 7 to 10).

The flank angles of the plurality of thread grooves are not particularly limited and may be any angle. For example, the angle of the stabbing flank is preferably +5 to +40 degrees with respective to a straight line perpendicular to the pipe axis. The angle of the load flank is preferably—10 to 0 degrees with respective to a straight line perpendicular to the pipe axis. The flank angle is defined as positive when the flank surface is inclined toward the thread and negative when it is inclined toward the opposite side of the thread, with respect to a straight line perpendicular to the pipe axis.

The depth of the thread groove is not particularly limited, but it is preferably between 0.03 and 0.10 inches. The number of threads per inch is preferably 4 to 10. Therefore, the thread pitch, which is the distance between threads, is preferably 0.1 to 0.25 inches. The thread width, which is the width of the thread at the middle height of the thread, is preferably 0.4 to 0.6 times the thread pitch.

(Unthreaded Portion)

The pin preferably includes a portion without thread (hereafter, referred to as "unthreaded portion") at the most tip, that is, on the tip side farther than the male thread portion. The box preferably includes an unthreaded portion on a position nearer the center side in the pipe axis direction than the female thread portion, that is, on the side opposite to the end. When the pin and the box are tightened, the unthreaded portion of the pin and the unthreaded portion of the box contact with each other to form a metal-metal contacting seal.

[Type of Joint]

The threaded joint of the present disclosure may have any structure if the above conditions are satisfied. For example, the threaded joint of the present disclosure may be either a coupling-type threaded joint or an integral-type threaded joint.

Figure 5:
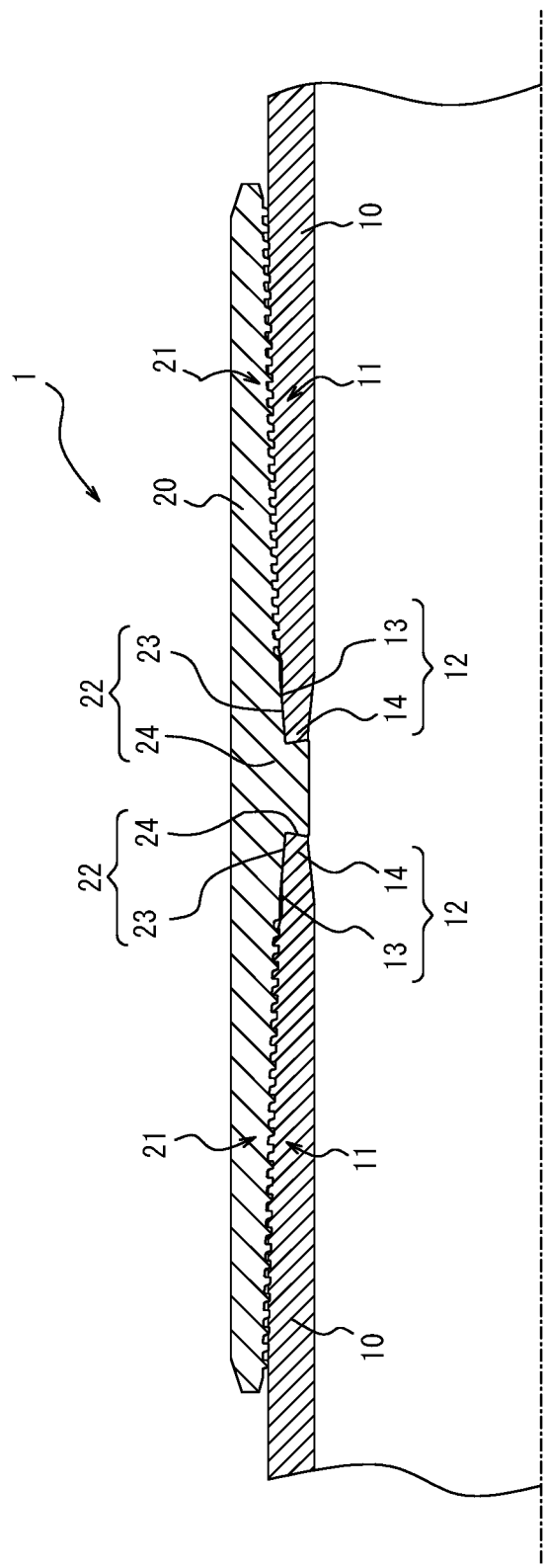
FIG. 5 schematically illustrates the cross section of an example of the structure of a coupling-type threaded joint.

FIG. 5 schematically illustrates the structure of a coupling-type threaded joint for pipes 1 of one embodiment of the present disclosure. A coupling-type threaded joint for pipes is a threaded joint that connects two pipes using a coupling as a box, which is also called thread-and-coupling (T&C) type.

The coupling-type threaded joint for pipes 1 includes a pin 10 and a box (coupling) 20. The pin 10 has a structure where a male thread portion 11, which is a male tapered thread, is provided at the end of a pipe, and the box 20 has a structure where a female thread portion 21, which is a female tapered thread to be screwed with the male thread portion 11 of the pin 10, is provided at both ends of a pipe.

The pin 10 preferably includes an unthreaded portion 12 at the most tip, that is, on the tip side farther than the male thread portion 11, as illustrated in FIG. 5. Further, the box 20 preferably includes an unthreaded portion 22 on a position nearer the center side in the pipe axis direction than the female thread portion 21, that is, on the side opposite to the end. When the pin 10 and the box 20 are tightened, the unthreaded portion of the pin 10 and the unthreaded portion of the box 20 contact with each other to form a metal-metal contacting seal.

The unthreaded portion preferably includes a seal portion and a shoulder portion as illustrated in FIG. 5. For example, the unthreaded portion 12 of the pin 10 may include a seal portion 13 and a shoulder portion 14 located on the tip side farther than the seal portion 13. Further, the unthreaded portion 22 of the box 20 may include a seal portion 23 and a shoulder portion 24 located nearer the center side than the seal portion 23. The shoulder portion 14 of the pin 10 may be perpendicular to the pipe axis, or it may be inclined toward the pin side with respect to a straight line perpendicular to the pipe axis. The angle between the shoulder portion 14 of the pin 10 and a straight line perpendicular to the pipe axis is preferably 0 to 30 degrees.

The shape of the seal portion of the pin and the shape of the seal portion of the box are not particularly limited, but they may be, for example, a combination of the following.

Figure 6:
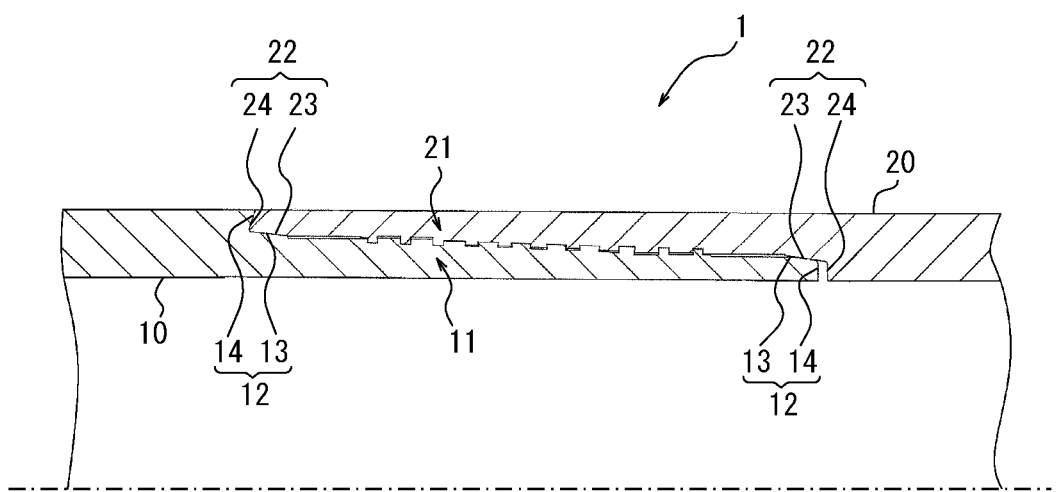
FIG. 6 schematically illustrates the cross section of an example of the structure of an integral-type threaded joint.

Box side: tapered, pin side: tapered
Box side: tapered, pin side: convex curved
Box side: convex curve, pin side: tapered
Box side: concave curve, pin side: convex curve On the other hand, FIG. 6 schematically illustrates the structure of an integral-type threaded joint for pipes 1 in another embodiment of the present disclosure. In the integral-type threaded joint for pipes 1, two pipes are directly connected without using a coupling. That it, the pin 10 has a structure where a male thread portion 11, which is a male tapered thread, is provided at one end of a first pipe, and the box 20 has a structure where a female thread portion 21, which is a female tapered thread to be screwed with the male thread portion 11 of the pin 10, is provided at one end of a second pipe.

The pin 10 preferably includes an unthreaded portion 12 at the most tip, that is, on the tip side farther than the male thread portion 11, as illustrated in FIG. 6. Further, the pin 10 preferably includes an unthreaded portion 12 on a position nearer the center side in the pipe axis direction than the male thread portion 11, that is, on the side opposite to the end. The box 20 also preferably includes an unthreaded portion 22 on a position nearer the center side in the pipe axis direction than the female thread portion 21, that is, on the side opposite to the end. Further, the box 20 preferably includes an unthreaded portion 22 at the most tip, that is, on the tip side farther than the female thread portion 21. When the pin 10 and the box 20 are tightened, the unthreaded portion of the pin and the unthreaded portion of the box contact with each other to form a metal-metal contacting seal.

The unthreaded portion 12 of the pin 10 preferably include a seal portion 13, as illustrated in FIG. 6. The unthreaded portion 12 of the pin 10 may also include a shoulder portion 14. The unthreaded portion 22 of the box 20 preferably include a seal portion 23. The unthreaded portion 22 of the box 20 may also include a shoulder portion 24. The structures of the seal portion and shoulder portion may be the same as those described for the coupling-type threaded joint.

Because FIGS. 5 and 6 are figures schematically explaining types of the joint, the shapes of the thread groove and the thread are illustrated in a simplified manner.

[Material]

The material of the presently disclosed threaded joint is not particularly limited, and any material may be used. The stress dispersion effect of the present disclosure is a mechanical effect rather than a chemical effect, which is obtained by improving the shape of the corner portion of the thread bottom and is therefore independent of the material. From the viewpoint of the strength of the joint, it is usually preferable to use metal as the material of the pin and the box, and it is more preferable to use either steel or a Ni-based alloy. The steel may be either carbon steel or alloy steel. The material of the pin and the material of the box may be different, but it is preferable to use the same material.

Next, the shape of the thread groove in the threaded joint of the present disclosure will be described in more detail based on four embodiments. In each of the following embodiments, it is acceptable that at least the first thread groove has the structure described below. However, as described above, it is preferable that all thread grooves of the box have the structure described below from the viewpoint of ease of production.

First Embodiment

Figure 7:
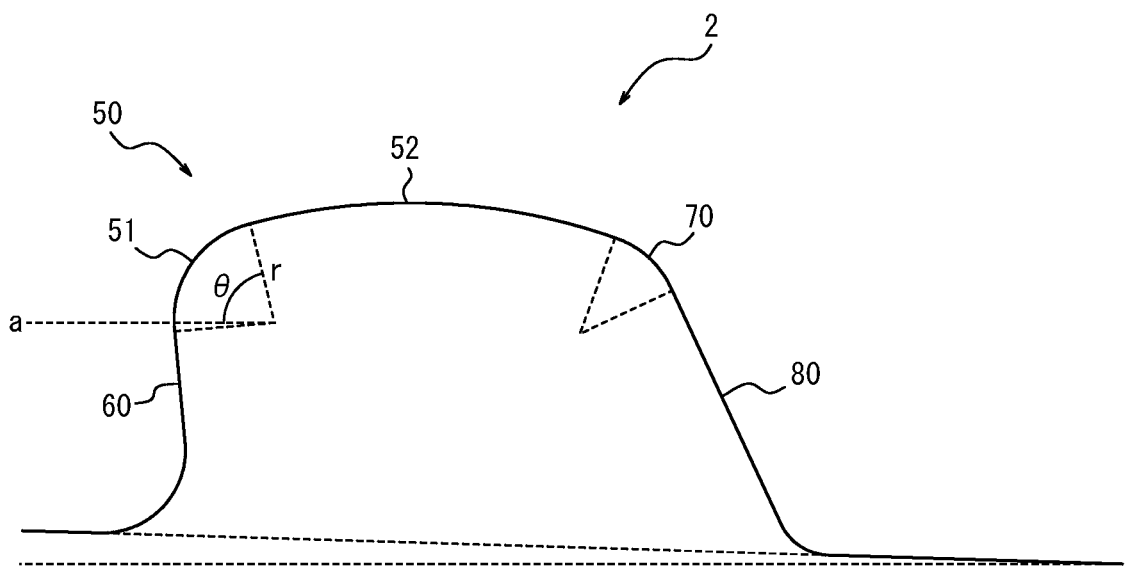
FIG. 7 schematically illustrates the shape of a first thread groove in a first embodiment.

FIG. 7 schematically illustrates the shape of a thread groove 2 in a first embodiment of the present disclosure. In this embodiment, a corner portion 50 on the load flank side on the thread bottom side of the thread groove 2 includes a first arc portion 51 directly connected to a linear load flank 60 and a second arc portion 52 directly connected to the first arc portion 51. Further, a ratio of curvature radius (R2/R1), which is a ratio of the curvature radius R2 of the second arc portion 52 to the curvature radius R1 of the first arc portion 51, is 3 or more. In the example illustrated in FIG. 7, the second arc portion 52 extends to a corner portion 70 on the stabbing flank side, and the second arc portion 52 forms the thread bottom. The corner portion 70 on the stabbing flank side consists of a single arc, which is directly connected to the straight stabbing flank 80.

Second Embodiment

Figure 8:
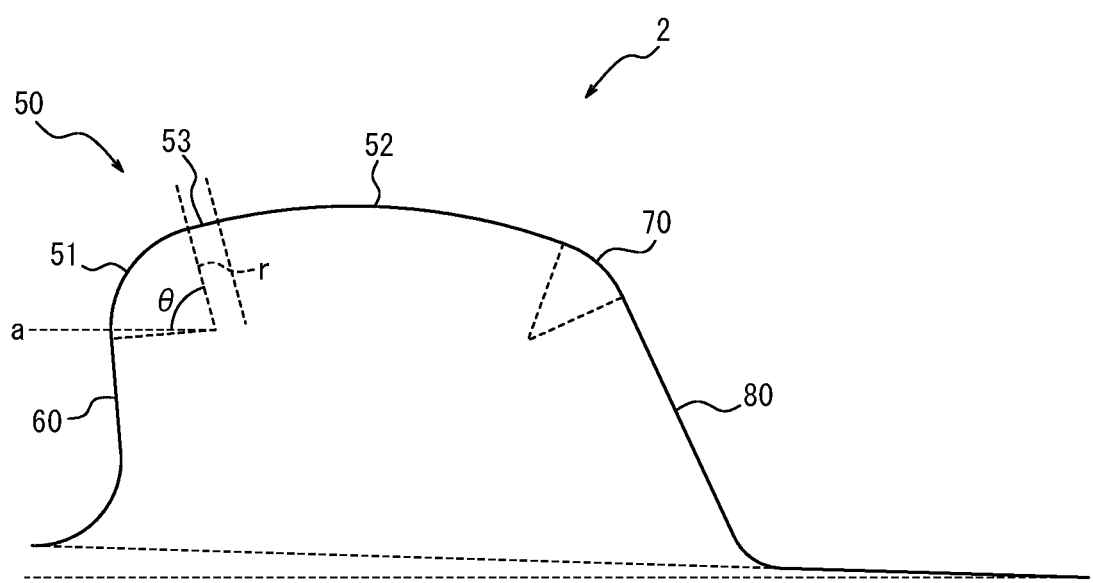
FIG. 8 schematically illustrates the shape of a first thread groove in a second embodiment.

FIG. 8 schematically illustrates the shape of a thread groove 2 in a second embodiment of the present disclosure. In this embodiment, a corner portion 50 on the load flank side on the thread bottom side of the thread groove 2 includes a first arc portion 51 directly connected to a linear load flank 60 and a second arc portion 52 connected to the first arc portion 51 via a straight portion 53. In other words, the load flank 60, the first arc portion 51, the straight portion 53, and the second arc portion 52 are connected in this order. The others are the same as in the first embodiment. By providing a straight portion 53, the stress dispersion effect can be further enhanced. The straight portion 53 is preferably a common tangent line between the first arc portion 51 and the second arc portion 52.

The length of the straight portion 53 is not particularly limited, but the length of the straight portion 53 is preferably 0.010 inches or less from the viewpoint of avoiding an excessively large thread groove.

Third Embodiment

Figure 9:
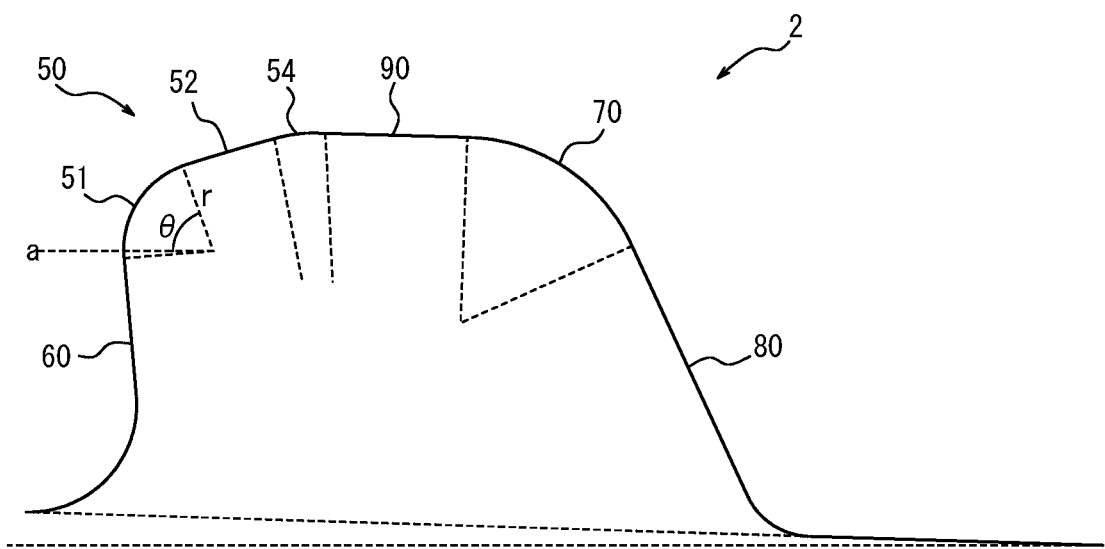
FIG. 9 schematically illustrates the shape of a first thread groove in a third embodiment.

FIG. 9 schematically illustrates the shape of a thread groove 2 in a third embodiment of the present disclosure. In this embodiment, the thread groove 2 has a straight thread bottom portion 90 parallel to the taper of the female thread portion. When the bottom of the thread groove is formed by a straight line like this, it is easy to determine the depth (thread height) of the thread groove. The straight thread bottom portion 90 may be directly connected to a corner portion 70 on the stabbing flank side as illustrated in FIG. 9.

Further, in the embodiment illustrated in FIG. 9, the corner portion 50 on the load flank side includes a third arc portion 54 between the second arc portion 52 and the straight thread bottom portion 90. By providing a third arc portion 54 like this, the second arc portion 52 and the straight thread bottom portion 90 can be smoothly connected via the third arc portion 54. The others may be the same as in the first and second embodiments. Although the second arc portion 52 and the third arc portion 54 are directly connected in the embodiment illustrated in FIG. 9, the second arc portion 52 and the third arc portion 54 may be connected via a straight portion.

The curvature radius of the third arc portion 54 is not particularly limited, but it is preferably larger than the curvature radius of the first arc portion 51. The curvature radius of the third arc portion 54 may be, for example, 0.010 inches to 0.200 inches.

The straight thread bottom portion 90 may be provided even if there is no third arc portion 54. In that case, the second arc portion 52 and the straight thread bottom portion 90 may be directly connected.

Fourth Embodiment

Figure 10:
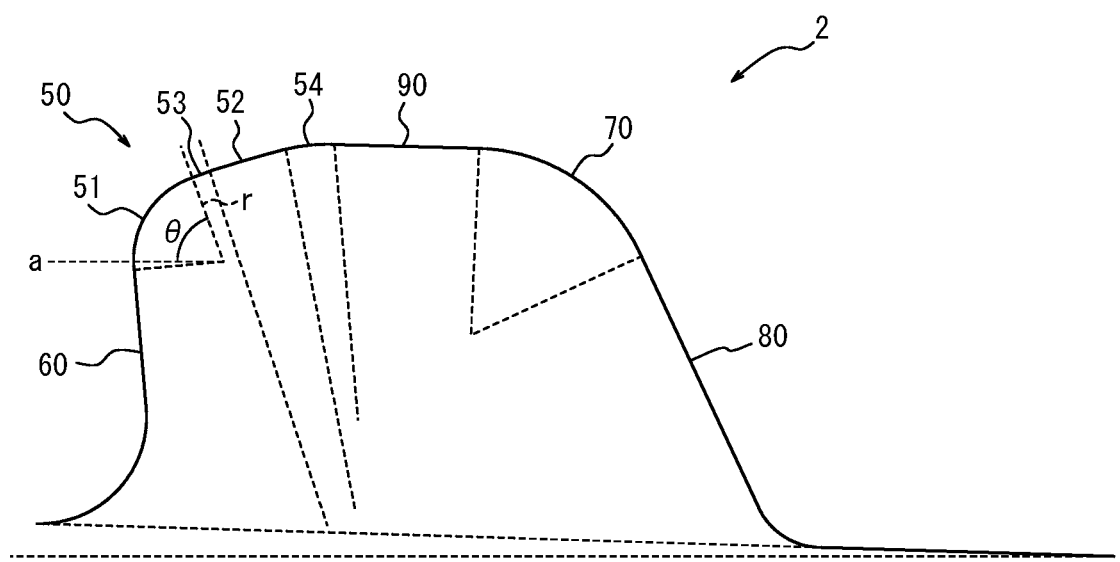
FIG. 10 schematically illustrates the shape of a first thread groove in a fourth embodiment.

FIG. 10 schematically illustrates the shape of a thread groove 2 in a fourth embodiment of the present disclosure. In this embodiment, the thread groove 2 has a straight thread bottom portion 90 parallel to the taper of the female thread portion, as in the third embodiment. Further, a corner portion 50 on the load flank side includes a first arc portion 51 directly connected to a load flank 60, a second arc portion 52 connected to the first arc portion 51 via a straight portion 53, and a third arc portion 54 directly connected to the second arc portion. In other words, the load flank 60, the first arc portion 51, the straight portion 53, the second arc portion 52, and the third arc portion 54 are connected in this order. The others may be the same as in the first to third embodiments.

Examples

A steel pipe with outer diameter 9.625 inches×thickness 0.545 inches (outer diameter 244.48 mm×thickness 13.84 mm) was prepared with a steel sample corresponding to Category: 13-5-2, Grade: 110 of API 5 CRA, and the steel pipe was processes to obtain a threaded joint including a pin and a box corresponding to the pin. The shape of the thread groove of the obtained threaded joint is as indicated in Table 1. The number of threads per inch was 5 (5 TPI), and the thread height was 0.062 inches (1.575 mm). The stabbing flank angle was 25 degrees, the load flank angle was −5 degrees, and the thread taper was 1/16. The tensile efficiency was designed to be 110% or less to suppress the outer diameter of the box. As used herein, the shape of the thread groove refers to the shape before tightening the prepared pin and box.

Next, an airtightness test was conducted under the conditions conforming to Connection Application Levels (CAL) IV of API 5C5: 2017, and the performance of the threaded joint was evaluated. Table 1 lists the test results. In the airtightness test, a case where the box did not fracture was evaluated as "pass", and a case where the box fractured was evaluated as "fail".

As indicated in Table 1, in the threaded joint satisfying the requirements of the present disclosure, the box did not fracture even if the tensile efficiency was 109% or less. Particularly in Example No. 3, no fracture occurred even when the tensile efficiency was 101%. On the other hand, in a comparative example without second arc portion, the box fractured even if the tensile efficiency was increased to 110%. Even when a second arc portion was provided, the box fractured in a comparative example with a ratio of curvature radius of less than 3, even if the tensile efficiency was increased to 110%. To prevent the fracture of a box with the method proposed in PTL 1, the tensile efficiency should be increased to 116% under the conditions of Comparative Example No. 6 and to 111% under the conditions of Comparative Example No. 7.

As can be understood from the results, the present disclosure can prevent fracture of a box under a tensile load without increasing the outer diameter of the box. Therefore, the present disclosure can solve the conflicting problems of fracture prevention and cost reduction.

TABLE 1

| | Thread groove shape | | | | | | | | | |
|---|---|---|---|---|---|---|---|---|---|---|
| | First arc portion | | Straight | Second arc portion | Ratio of | Straight thread | | Box | | |
| No. | Curvature radius (in) | Angle θ (°) | portion Length (in) | Curvature radius (in) | curvature radius (-) | bottom portion Length (in) | Tensile efficiency (%) | outer diameter (in) | Test results | Remarks |
| 1 | 0.0200 | 75 | — | 0.120 | 6.0 | — | 105 | 10.530 | Pass | Example |
| 2 | 0.0120 | 75 | — | 0.150 | 12.5 | — | 103 | 10.513 | Pass | Example |
| 3 | 0.0087 | 70 | 0.0016 | 0.100 | 11.5 | — | 101 | 10.499 | Pass | Example |
| 4 | 0.0087 | 60 | — | 0.030 | 3.4 | 0.0580 | 109 | 10.566 | Pass | Example |
| 5 | 0.0087 | 60 | — | 0.020 | 2.3 | 0.0641 | 110 | 10.572 | Fracture | Comparative Example |
| 6 | 0.0087 | 91.79 | — | — | — | 0.0719 | 110 | 10.569 | Fracture | Comparative Example |
| 7 | 0.0130 | 91.79 | — | — | — | 0.0660 | 110 | 10.569 | Fracture | Comparative Example |

REFERENCE SIGNS LIST 1 threaded joint for pipes
2 thread groove
10 pin
11 male thread portion
12 unthreaded portion
13 seal portion
14 shoulder portion
20 box
21 female thread portion
22 unthreaded portion
23 seal portion
24 shoulder portion
50 corner portion on the load flank side
51 first arc portion
52 second arc portion
53 straight portion
54 third arc portion
60 load flank
70 corner portion on the stabbing flank side
80 stabbing flank
90 straight thread bottom portion
100 threaded joint for pipes
110 pin
111 male thread portion
112 unthreaded portion
113 seal portion
114 shoulder portion
120 box
121 female thread portion
122 unthreaded portion
123 seal portion
124 shoulder portion
200 thread groove
210 straight thread bottom portion
220 load flank
230 stabbing flank
240 corner portion on the load flank side
250 corner portion on the stabbing flank side
a straight line parallel to the pipe axis
r radius at the end of the first arc portion on the opposite side of the load flank
θ angle between the straight line "a" and the radius "r"

The invention claimed is:

1. A threaded joint for pipes, comprising
a pin provided with a male thread portion, which is a male tapered thread, at one end of a first pipe, and
a box provided with a female thread portion, which is a female tapered thread to be screwed with the male thread portion, at one end of a second pipe, wherein
the female thread portion has a plurality of thread grooves,
each of the plurality of thread grooves has a corner portion on a load flank side and a corner portion on a stabbing flank side on a thread bottom side,
a flank angle of the plurality of thread grooves, which is defined as positive when a flank surface is inclined toward the thread and negative when it is inclined towards the opposite side of the thread, with respect to a straight line perpendicular to a pipe axis, satisfy the following conditions (a) and (b):
(a) an angle of the stabbing flank is +5 to +40 degrees with respect to a straight line perpendicular to the pipe axis; and
(b) an angle of the load flank is −10 to 0 degrees with respect to a straight line perpendicular to the pipe axis,
the corner portion on a load flank side of a first thread groove, which is the thread groove farthest from an end of the box among the plurality of thread grooves, comprises a first arc portion that is directly connected to a load flank and has a first curvature radius, and a second arc portion that is directly or indirectly connected to the first arc portion and has a second curvature radius, and
a ratio of curvature radius, which is a ratio of the second curvature radius to the first curvature radius, is 3 or more.

2. The threaded joint for pipes according to claim 1, wherein the second arc portion is directly connected to the first arc portion.

3. The threaded joint for pipes according to claim 2, wherein the corner portion on the load flank side of the first thread groove further comprises a third arc portion directly or indirectly connected to the second arc portion.

4. The threaded joint for pipes according to claim 3, wherein the first thread groove has a straight thread bottom portion parallel to a taper of the female thread portion.

5. The threaded joint for pipes according to claim 2, wherein the first thread groove has a straight thread bottom portion parallel to a taper of the female thread portion.

6. The threaded joint for pipes according to claim 1, wherein the second arc portion is connected to the first arc portion via a straight portion.

7. The threaded joint for pipes according to claim 6, wherein the corner portion on the load flank side of the first thread groove further comprises a third arc portion directly or indirectly connected to the second arc portion.

8. The threaded joint for pipes according to claim 7, wherein the first thread groove has a straight thread bottom portion parallel to a taper of the female thread portion.

9. The threaded joint for pipes according to claim 6, wherein the first thread groove has a straight thread bottom portion parallel to a taper of the female thread portion.

10. The threaded joint for pipes according to claim 1, wherein the corner portion on the load flank side of the first thread groove further comprises a third arc portion directly or indirectly connected to the second arc portion.

11. The threaded joint for pipes according to claim 10, wherein the first thread groove has a straight thread bottom portion parallel to a taper of the female thread portion.

12. The threaded joint for pipes according to claim 1, wherein the first thread groove has a straight thread bottom portion parallel to a taper of the female thread portion.

* * * * *